M. S. CONNER.
TELEPHONE EXCHANGE SYSTEM.
APPLICATION FILED FEB. 23, 1906.
901,686.
Patented Oct. 20, 1908.
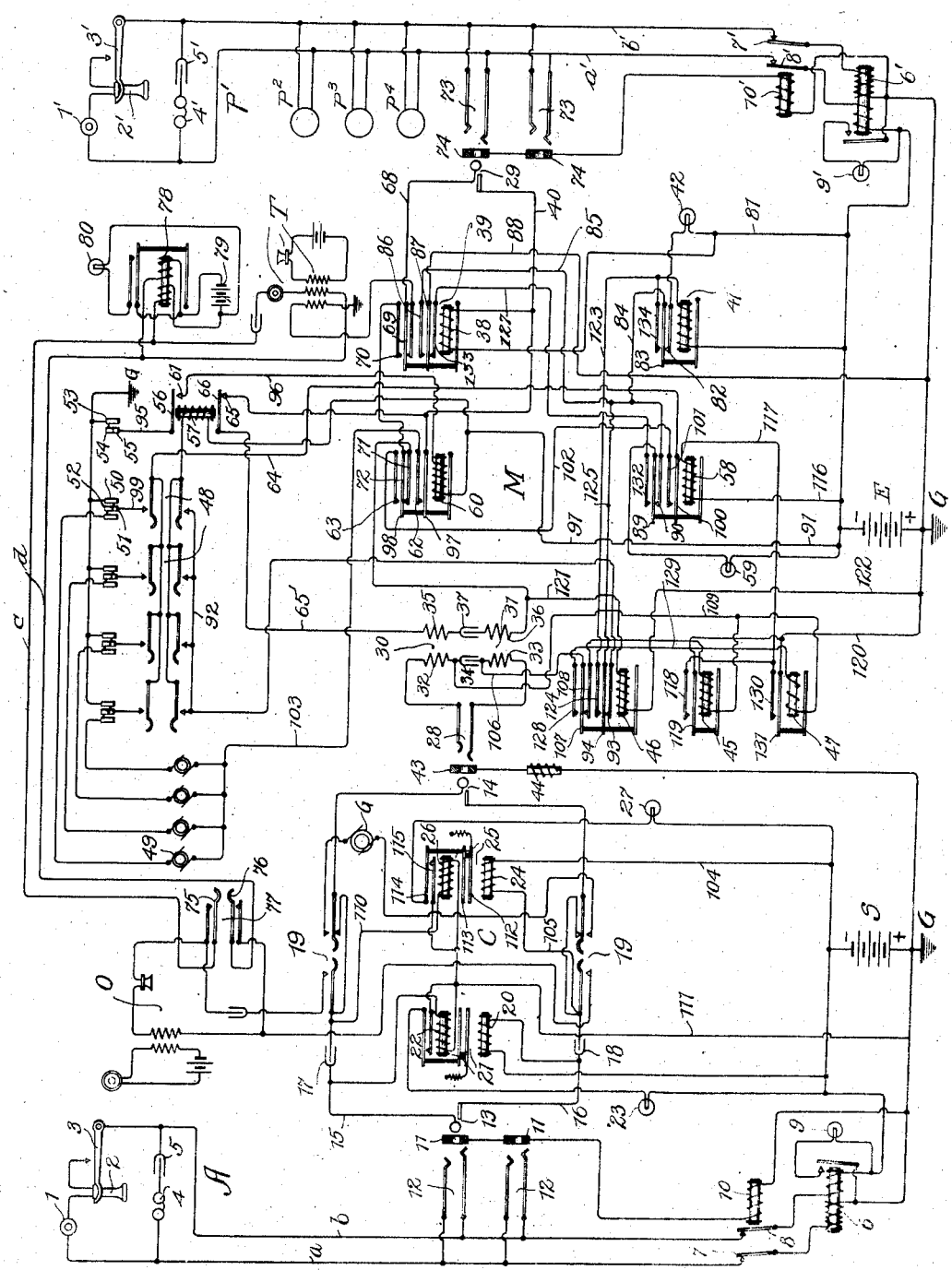
Witnesses:
Leonard W. Novander
George E. Higham
Inventor
Merritt S. Conner
By Charles A. Brown
Attorney

UNITED STATES PATENT OFFICE.

MERRITT S. CONNER, OF ROCHESTER, NEW YORK, ASSIGNOR TO STROMBERG-CARLSON TELEPHONE MANUFACTURING COMPANY, OF ROCHESTER, NEW YORK, A CORPORATION OF NEW YORK.

TELEPHONE-EXCHANGE SYSTEM.

No. 901,686.

Specification of Letters Patent.

Patented Oct. 20, 1908.

Application filed February 23, 1906. Serial No. 302,372.

*To all whom it may concern:*

Be it known that I, MERRITT S. CONNER, citizen of the United States, residing at Rochester, in the county of Monroe and State of New York, have invented a certain new and useful Improvement in Telephone-Exchange Systems, of which the following is a full, clear, concise, and exact description, reference being had to the accompanying drawings, forming a part of this specification.

My invention relates to telephone exchange systems and has for its object the provision of improved trunk means for connecting subscribers connected with a sub-central exchange with subscribers connected with a main exchange, the main feature of the invention being the improved supervisory mechanism and arrangement thereof.

In my improved arrangement the operator at the sub-exchange has control of the application of ringing current to the called line, the operations for setting the ringing mechanism in condition to be connected being controlled primarily by the trunk operator, and the main invention resides in novel adjustment and arrangement of controlling and supervisory relays.

My invention will be better understood when described with reference to the accompanying drawing which diagrammatically shows the arrangement in accordance with my invention.

The sub-station A connects through the line limbs $a$ and $b$ with the sub-exchange and is provided with the usual telephonic apparatus comprising the transmitter, 1, receiver 2 and switch hook 3 normally connected in an open branch across the line limb, and a signal bell 4 connected in bridge of the line limbs with a condenser 5. The indicating relay 6 at the exchange is normally connected through the armatures, 7 and 8, with the line limbs and with the common source S and controls the circuit through the indicating lamp 9. The cut off relay 10 controls the armatures 7 and 8 and connects between the positive side of battery and the thimbles 11 for the multiple jacks 12. The cord circuit at the sub-central exchange comprises the plugs 13 and 14 connected through tip and sleeve strands 15 and 16, condensers 17 and 18 being interposed to divide the cord circuit into two conductively disconnected halves or parts. The cord circuit also includes the operator's key 19 of the usual construction and arrangement adapted upon actuation in one direction to connect the operator's telephonic apparatus O with the cord strands and upon actuation in the opposite direction to connect the generator G with the cord strands leading to the calling plug 14. The winding 20 of the compound supervisory relay 21 connects between the sleeve strand 16 on the answering side of the cord circuit and with the negative side of the battery S. The winding 22 of the supervisory relay connects between the tip strands 15 of the answering side and with the positive terminal of the battery S, this supervisory relay controlling the answering supervisory lamp 23. The winding 24 for the calling supervisory relay 25 connects between the negative side of the battery and the sleeve strand 16 of the calling side of the cord circuit, while the winding 26 connects between positive side of the battery and the tip strand 15 at the calling side of the cord strand, this relay 25 controlling the circuit for the calling supervisory lamp 27.

A trunk circuit at the main exchange M terminates at one end in the springjack 28 and at the other end in the calling plug 29, the cord circuit being divided into two conductively separated parts by means of repeating coils 30 and 31, the windings 32 and 33 being included in the springjack side and separated by the condenser 34, while the windings 35 and 36 are included in the calling side and conductively separated by the condenser 37. The winding 38 of the calling side of supervisory relay 39 connects between the calling sleeve strand 40 and the negative side of the main exchange battery E and controls a plurality of contacts for circuits which will be described later. A relay 41 is provided which in conjunction with supervisory relay 39 controls the circuit through the supervisory lamp 42. The jack thimble 43 for the springjack 28 connects through an impedance winding 44 with the positive side of battery S at the sub-central exchange C, and connected in bridge of the condenser 34 at the trunk exchange is a relay 45, the circuit for this relay being controlled at the trunk exchange by the relay 46 to be connected in circuit when said relay 46 is inert, and another relay 47 is adapted to be substituted for the relay 45 when the relay 46 becomes active, all of which will be more fully described when the operation of the system is described and the circuits traced.

The selective ringing mechanism for the trunk exchange is like that shown in the application of Arthur R. Kahl, Serial No. 298,741, filed January 31, 1906, and this relay apparatus comprises any number of selective keys 48 and a suitable number of sources 49 for providing selective signaling current. Interrupting mechanism 50 is also adapted to be included in the ringing circuit upon actuation of the key, each interrupter, as in the referred to application, being provided with a segment 51 connected with ground G and a segment 52 connected with the generator. Interrupters for the various keys are mounted on the same shaft with a common interrupting means 53 provided with the grounded segment 54 and the segment 55 connected with the armature 56 of a locking relay 57 which is also mechanically associated with the keys to lock any key to maintain application of ringing current. As described in the aforesaid application, the segments 52 are slightly shorter than the segment 54, the exact operation of which will appear later. One terminal of the relay 57 connects with the negative side of battery E, while the other terminal connects with each of the keys 48 to be connected through contacts of relay 46, through contacts of another relay 58 and through contacts of supervisory relay 39 with the positive side of the battery. The relay 58 just mentioned is controlled at different times by the relays 45 and 47 and in turn this relay in conjunction with supervisory relay 39 controls the circuit through the disconnect signal lamp 59. A controlling relay 60 is also associated with the cord circuit, one of its terminals connecting with the negative side of battery E and the other terminal connecting with contact 61 of relay 57. The contacts 62 and 63 connect with the terminals of the ringing circuit and are normally disconnected from the cord strands, the ringing lead 64 being also further controlled by contacts of relay 58. The sleeve strand 65' of the cord circuit is normally closed by engagement of the contact 65 with the armature 66 of the relay 57, while the tip strand 68 of the cord circuit is normally open at the contacts 69 and 70 of the supervisory relay 39 but closed at the contacts 71 and 72 of the relay 60.

The line limbs $a'$ and $b'$ of the called line terminating in springjacks 73 extend to a plurality of party substations $P^1$, $P^2$, $P^3$, $P^4$, etc., each provided with a transmitter 1', receiver 2', hook 3' connected in a normally open branch of the line limbs and a signal bell 4' normally connected in a branch with a condenser 5'. The indicating relay 6' is normally connected through armatures 7' and 8' with the line and controls the indicating lamp 9'. The cut off relay 10' connects between the positive side of battery E and with the jack thimbles 74.

The operators of the exchanges may also connect through the limbs $c$ and $d$ of an ordering circuit terminating at the sub-exchange in the springs 75 and 76 of the order key 77 and at the trunk exchange connecting through the windings of the relay 78 and source of current 79, this relay controlling the signal lamp 80. The trunk operator's telephonic apparatus T also connects with this order line and at the sub-exchange the operator's set O will connect with the order line upon actuation of the order key 77.

The operation of the system will now be readily understood. Suppose that the subscriber at substation A desires communication with a subscriber at substation P'. Upon removal of the receiver 2 from the hook circuit will be closed in a well known manner through the indicating relay 6 to cause closure of the circuit through indicating lamp 9, in answer to which the sub-exchange operator inserts plug 13 into one of the springjacks 12, whereupon circuit through the cut off relay 10 is completed through the sleeve strand 16 and the winding 20 of the supervisory relay, the signal lamp 9 being extinguished. Upon removal of the receiver, circuit is also closed through winding 22 and the associated contacts are disengaged to open the circuit of the supervisory lamp 23. The operator actuates her key 19 in the proper direction to connect her telephone set in circuit and ascertains from the calling subscriber the connection desired. She thereupon actuates order key 77 to complete the order circuit through her telephone set which will cause actuation of relay 78 to close circuit through the order lamp 80, and the trunk operator by means of her telephone set ascertains from the sub-exchange operator the connection desired and at the same time notifies the sub-exchange operator which trunk circuit is to be used for making the connection, which in this case will be the trunk circuit M. The trunk operator connects the calling plug 29 of the cord circuit with one of the springjacks 73 and this causes the circuit through cut-off relay 10' to be completed through the sleeve strand 40 and winding 38 to negative side of battery E, whereupon the indicating signal 9' becomes inert and relay 39 energized to close the following circuit: negative side of battery E through conductor 81, supervisory lamp 42, contacts 82 and 83 of relay 41, conductors 84 and 85, contacts 86 and 87 of relay 39 and through conductor 88 to positive side of battery. Upon actuation of relay 39 circuit is also closed from negative side of battery E through lamp 59, contacts 89 and 90 of relay 58, through conductor 85, contacts 86 and 87 and through conductor 88 to positive side of battery to illuminate the lamp 59. The operator now sets one of the keys 48 connected with the source which is to provide signal current for selecting the desired substation, the key here used being the one indicated by reference character. Upon setting of this key the circuit is immediately closed from the negative side of battery E through conductor 91, through relay 57, through key 48, through conductor 92, through contacts 93 and 94 of relay 46, through conductor 125, through conductor 85, through contacts 86 and 87 of relay 39 and through conductor 88 to the positive side of battery E, the relay 57 becoming energized to mechanically lock the actuated key 48 in its depressed position and to attract its armature 56 into engagement with contact 61 and to withdraw its armature 66 from engagement with contact 65. When the segment 54 of interrupter 53 comes into contact with conductor 95 circuit may be traced from ground G through conductor 95, armature 56 and contact 61, conductor 96, through relay 60, through conductor 91 and through battery E to ground. Relay 60 thereupon becomes energized to move the contacts 97 and 98 into engagement with contacts 62 and 63 respectively connected with the terminals of the ringing circuit to connect these terminals with the cord strands leading to the calling plug 29, the tip strand of the calling side having become continuous at contacts 69 and 70 upon actuation of relay 39 and the other part of the tip strand having become disconnected from the calling side upon disengagement of contact 71 from contact 98. The other side of the sleeve strand of the cord circuit also becomes disconnected at contacts 66 and 65 of the relay 57 from the calling end of the sleeve strand, and upon application of ringing current this current will flow only toward the calling cord.

At the same time that circuit becomes closed through relay 60 the segment 52 connected with the signaling source 49 becomes connected with the key 48 and as soon as relay 58 becomes energized, as will be described presently, ringing current will flow from generator 49 through segment 52, conductor 99, through key 48, through conductor 64, through contacts 100 and 101 of the relay 58 when energized, through conductor 102, through contacts 63 and 72 of relay 60 and through the tip strand 68, thence through the line and substation P¹ back through the sleeve strand 40 through contacts 97 and 62 of relay 60 and back through conductor 103 to generator 49. As before stated, however, the segment 52 of the interrupter 50 is slightly shorter than segment 54 of the interrupter 53 but these segments connect at the same time respectively with signaling source 49 and with ground G, and therefore relay 57 and relay 60 controlled thereby are actuated at the same time. Owing to this difference in length of the segments, however, relay 57 remains connected in circuit an interval after the segment 52 disconnects from the signaling source, and in place of this segment 52 the grounded segment 51 is connected with the key 48 and during a short interval equivalent to the difference in length of the segments the cord circuit and lines will be grounded and thus relieved of any static charges which may have accumulated upon application of the alternating signaling current, this being similar to the arrangement in the application of Kahl referred to. The actuation of relay 58, however, depends upon the connection of the sub-exchange cord circuit with the trunk circuit, and therefore the ringing circuit is ineffective. The sub-exchange operator, however, having been notified by the main exchange operator which trunk was to be used in the connection, connected her calling plug 14 with the springjack 28 and circuit was immediately closed as follows: from negative side of battery S through conductor 104, supervisory winding 24, conductor 105, through the operator's key and sleeve strand, through the sleeve contact of plug 14, through springjack 28, through winding 33 of the repeating coil 31, through conductor 106, through contacts 107 and 108, through relay 45, through conductor 109, through repeating coil winding 32, through springjack 28, tip contact of plug 14, tip strand of the sub-exchange cord circuit, through conductor 110, through supervisory winding 26, and through conductor 111 to positive side of battery S. Circuit through the winding 24 is also closed through a shorter path from the sleeve contact of plug 14 to test thimble 43 and impedance winding 44 to positive side of battery S. Energization of winding 24 causes attraction of the armature 112 and if winding 26 were energized the corresponding armature 113 would be actuated to separate the contacts 114 and 115 controlling the circuit through the supervisory lamp 27 Relay 45, however, is of sufficiently high resistance when connected in circuit with the winding 26, as just described, to prevent sufficient current flow to energize this winding and therefore the supervisory lamp circuit will remain closed. This relay 45, however, itself becomes energized and closes circuit through the relay 58 as follows: negative side of battery E through conductor 116, through relay 58, through conductor 117, through contacts 118 and 119 of relay 45 and through conductor 120 to positive side of battery E. Upon energization of relay 58 signal lamp 59 becomes extinguished upon disconnection of contacts 89 and 90 which indicates to the trunk operator that the sub-central operator has connected with the proper trunk line. The connection of the ringing mechanism with the main trunk is also completed upon energization of this relay to connect together contacts 100 and 101 and the signaling pulsations will flow through the line and signal bell at the sub-station P¹ which is to be called and thus final application of signaling current to a called line is automatically controlled by apparatus connected with the trunk circuit, the operation of which apparatus is directly controlled by the sub-exchange operator, ringing being prevented until the proper connection has been made by the sub-exchange operator with the trunk line.

Upon receiving the signal the subscriber at the called substation removes the receiver from the hook and the following circuit is closed through the controlling relay 46 during the interval that the circuit through relay 60 is not completed through the interrupter 53: from negative side of battery E through conductor 81, supervisory relay winding 38, sleeve strand and contact of plug 29, through springjack 73, through the called sub-station telephonic apparatus back through springjack 73 to tip strand of contact 68 through closed contacts 69 and 70 through contacts 71 and 72 of relay 60, when said relay is inert, through conductor 121, through relay 46 and through conductor 122 to positive side of battery, and upon actuation of relay 46 several circuits are effected. In the first place upon disengagement of contacts 93 and 94 circuit through relay 57 is opened with a consequent release of the key 48 and disconnection thereby of the signaling apparatus. Upon deënergization of relay 57 the circuit through relay 60 is permanently broken, and the cord circuit is restored to be continuous for subsequent transmission for telephonic currents. Upon energization of relay 46 circuit is also closed through relay 41 as follows: from negative side of battery E through relay 41, through conductor 123, through contacts 124 and 94 of relay 46, through conductor 125, through conductor 85, through contacts 86 and 87 of relay 39 and through conductor 88 to positive side of battery, the circuit through supervisory lamp 42 being thereby opened.

The contact 107 of relay 46 disconnects from contact 108 and connects with contact 128 and the relay 47 will be substituted for the relay 45, current then flowing from conductor 106 through contacts 107 and 128, through conductor 129, through relay 47, through conductor 109 and through the remaining circuit before traced at the sub-central exchange. As relay 47, however, is of lower resistance than relay 45 sufficient current may now flow through winding 26 to allow actuation of the supervisory relay to open the circuit through supervisory lamp 27, this being indication to the sub-central exchange operator that the called substation has answered. Contacts 130 and 131 of relay 47 are in multiple of contacts 118 and 119 of relay 45 and circuit through relay 58 is therefore maintained. The subscribers are now connected for telephonic conversation.

When the subscribers are through talking their receivers are replaced on the hooks and at the sub-central exchange circuit is opened through winding 22 of the supervisory relay to cause illumination of supervisory lamp 23. At the main exchange the circuit is opened through relay 46 and the circuit through relay 41 is reopened and lamp 42 reilluminated which indicates to the trunk operator that subscriber at substation P¹ is through talking. Restoration of relay 46 causes disconnection of relay 47 and reinclusion in circuit of high resistance relay 45, and the current flow through the circuit including relay 45 and winding 26 of the supervisory relay is again reduced, whereby supervisory lamp 27 becomes illuminated. The sub-exchange operator now receives signals which indicate that both subscribers are through talking, and thereupon disconnects her cord circuit from the line and from the trunk circuit. This disconnects the circuit through relay 45, and relay 58 controlled thereby becomes deënergized, whereupon disconnect lamp 59 becomes illuminated upon reëngagement of contacts 89 and 90, this giving the signal to the trunk operator that the sub-exchange operator has disconnected from the trunk circuit. Upon disengagement of the trunk circuit from the line the entire system is in its normal state and ready for another connection.

An additional contact 132 is provided for contact 89 of relay 58 to which the lamp 59 connects, and this additional contact connects with the normal contact 133 of the supervisory relay 39. This provides a signal for the trunk operator upon connection with the trunk circuit when the calling side thereof is disconnected. Upon connection, for instance, of the cord circuit at the sub-central exchange with this trunk circuit, relay 45, and consequently relay 58, will be actuated and current will flow through the lamp 59 from negative battery through the lamp through contacts 89 and 132, through conductor 127, through contacts 133 and 87 of relay 39, and through conductor 88 to positive battery. Relay 41 may also be provided with an additional contact 134 for closing a local circuit therethrough after initial actuation thereof through the relay 46. This local circuit may be traced from negative battery through the relay winding, through contacts 134 and 83, through conductor 85, through contacts 86 and 87 of the relay 39 when the plug 29 is connected with the spring jack, and through conductor 88 to positive side of battery. Lamp 42 will, therefore, remain extinguished until the sub-central exchange operator disconnects her cord circuit from the line to cause illumination of the disconnect lamp 59, and in response to this disconnect signal the trunk operator disconnects the trunk from the called line, and supervisory relay 39 becoming deënergized, circuit through both the relay 41 and the lamp 42 will be broken.

I thus provide improved supervisory and signaling means for trunk circuit systems with which intermittent selective signaling is associated. This supervisory and signaling means cause the final application of ringing current to the line to be called to be delayed until the sub-central exchange operator has made the proper connections with the trunk line, this supervision being entirely automatic in its operations.

I do not wish to be limited to the precise form of apparatus and arrangement thereof herein shown and described, as changes may readily be made without departing from the spirit of the invention.

What I claim as new and desire to secure by Letters Patent is:

1. In a telephone exchange system, the combination with a calling substation connected with a sub-central exchange to a telephone line, of a substation to be called connected with the main exchange through a telephone line, a trunk circuit at the main exchange for connection with the line leading to the substation to be called, a cord circuit at the sub-exchange for connection with the calling line and said trunk circuit, a supervisory relay for the cord circuit, a controlling relay associated with the trunk circuit and adapted upon connection of the cord circuit with the trunk circuit to be connected in circuit with the supervisory relay, the resistance of said controlling relay being sufficiently high to normally prevent operation of the supervisory relay, signaling apparatus associated with the trunk circuit, a second relay for controlling the connection of said signaling apparatus with the trunk circuit and with the line leading to the substation to be called, said second relay being controlled by the controlling relay and actuated to connect the signaling apparatus with the trunk circuit upon connection of said controlling relay in circuit with the supervisory relay, and means adapted upon actuation of apparatus at the called substation in response to the signaling current for causing reduction of the resistance in the circuit connecting the supervisory controlling relay whereby sufficient current may flow to operate the supervisory relay to indicate such response of the called substation.

2. In a telephone exchange system, the combination with a calling substation connected with a sub-central exchange to a telephone line, of a substation to be called connected with the main exchange through a telephone line, a trunk circuit at the main exchange for connection with the line leading to the substation to be called, a cord circuit at the sub-exchange for connection with the calling line and said trunk circuit, a supervisory relay for the cord circuit, a controlling relay associated with the trunk circuit and adapted upon connection of the cord circuit with the trunk circuit to be connected in circuit with the supervisory relay, the resistance of said controlling relay being sufficiently high to normally prevent operation of the supervisory relay, signaling apparatus associated with the trunk circuit, a second relay for controlling the connection of said signaling apparatus with the trunk circuit and with the line leading to the substation to be called, said second relay being controlled by the controlling relay and actuated to connect the signaling apparatus with the trunk circuit upon connection of said controlling relay in circuit with the supervisory relay, means upon actuation of apparatus at the called substation in response to the signaling current for causing reduction of the resistance in the circuit connecting the supervisory controlling relay whereby sufficient current may flow to operate the supervisory relay to indicate such response of the called substation, and further means operable upon actuation of the substation apparatus for causing the second relay to be controlled to disconnect the signaling apparatus from the trunk circuit and line.

3. In a telephone exchange system, the combination with a calling substation connected with a sub-central exchange to a telephone line, of a substation to be called connected with the main exchange through a telephone line, a trunk circuit at the main exchange for connection with the line leading to the substation to be called, a cord circuit at the sub-exchange for connection with the calling line and said trunk circuit, a supervisory relay for the cord circuit, a controlling relay associated with the trunk circuit and adapted upon connection of the cord circuit with the trunk circuit to be connected in circuit with the supervisory relay, the resistance of said controlling relay being sufficiently high to normally prevent operation of the supervisory relay, a lower resistance circuit associated with the controlling relay, signaling apparatus associated with the trunk circuit, a second relay controlling the connection of said signaling apparatus with the trunk circuit, said second relay being controlled by the controlling relay, a main relay associated with the trunk circuit and controlling the high resistance relay and the lower resistance circuit associated therewith, said second relay being controlled by the controlling relay upon connection of said controlling relay in circuit through the supervisory relay to connect the signaling apparatus with the trunk circuit whereby the substation to be called is signaled, and means operable upon actuation of apparatus at the called substation in response to the signaling current for causing actuation of the main relay to render the low resistance circuit effective whereby sufficient current may flow to cause operation of the supervisory relay to indicate such response of the called substation.

4. In a telephone exchange system, the combination with a calling substation connected with a sub-central exchange to a telephone line, of a substation to be called connected with the main exchange through a telephone line, a trunk circuit at the main exchange for connection with the line leading to the substation to be called, a cord circuit at the sub-exchange for connection with the calling line and said trunk circuit, a supervisory relay for the cord circuit, a controlling relay associated with the trunk circuit and adapted upon connection of the cord circuit with the trunk circuit to be connected in circuit with the supervisory relay, the resistance of said controlling relay being sufficiently high to normally prevent operation of the supervisory relay, a low resistance relay, a third relay controlled by said low and high resistance relays, signaling apparatus adapted for connection with the trunk circuit upon actuation of the third relay to send signaling current to the substation to be called, and a main relay, actuation of substation apparatus in response to the signaling current causing actuation of the main relay to substitute the low resistance relay for the high resistance relay whereby the supervisory relay may operate to indicate the response of the called substation.

5. In a telephone exchange system, the combination with a calling substation connected with a sub-central exchange to a telephone line, of a substation to be called connected with the main exchange through a telephone line, a trunk circuit at the main exchange for connection with the line leading to the substation to be called, a cord circuit at the sub-exchange for connection with the calling line and said trunk circuit, a supervisory relay for the cord circuit, a controlling relay associated with the trunk circuit and adapted upon connection of the cord circuit with the trunk circuit to be connected in circuit with the supervisory relay, the resistance of said controlling relay being sufficiently high to normally prevent operation of the supervisory relay, signaling apparatus at the main exchange, relay mechanism for connecting the signaling apparatus with the trunk circuit, additional relay mechanism controlling the direct application of the ringing current to the line leading to the substation to be called, said additional relay mechanism being controlled by the high resistance relay and actuated upon energization of the high resistance relay when the cord circuit is connected with the trunk circuit, a low resistance relay, and a main relay associated with the trunk circuit, actuation of substation apparatus in response to the signaling current causing actuation of the main relay to substitute the low resistance relay for the high resistance relay whereby the supervisory relay may operate to indicate the response of the called substation, said additional relay mechanism upon de-energization of the high resistance relay being thereafter controlled by the low resistance relay, actuation of the main relay also causing operation of the first relay mechanism to disconnect the signaling apparatus from the trunk circuit.

6. In a telephone exchange system, the combination with a cord circuit, of a trunk circuit, a supervisory relay associated with the cord circuit, a high resistance relay associated with the trunk circuit, connection of said cord circuit with the trunk circuit causing the supervisory relay and the high resistance relay to be connected in a circuit whereby the high resistance relay is actuated, the resistance, however, being sufficient to prevent operation of the supervisory relay, signaling apparatus associated with the trunk circuit, a controlling relay for controlling the final connection of the signaling apparatus with the trunk circuit, said controlling relay being normally controlled by the high resistance relay, a low resistance relay, and a main relay adapted upon actuation to substitute the low resistance relay for the high resistance relay whereby the supervisory relay may operate, the control of the controlling relay being transferred to the low resistance relay upon such substitution.

In witness whereof, I hereunto subscribe my name this 20th day of Feby. A. D., 1906.

M. S. CONNER.

Witnesses:
  E. A. HAWKINS,
  C. E. HAGUE.